Figure 1:
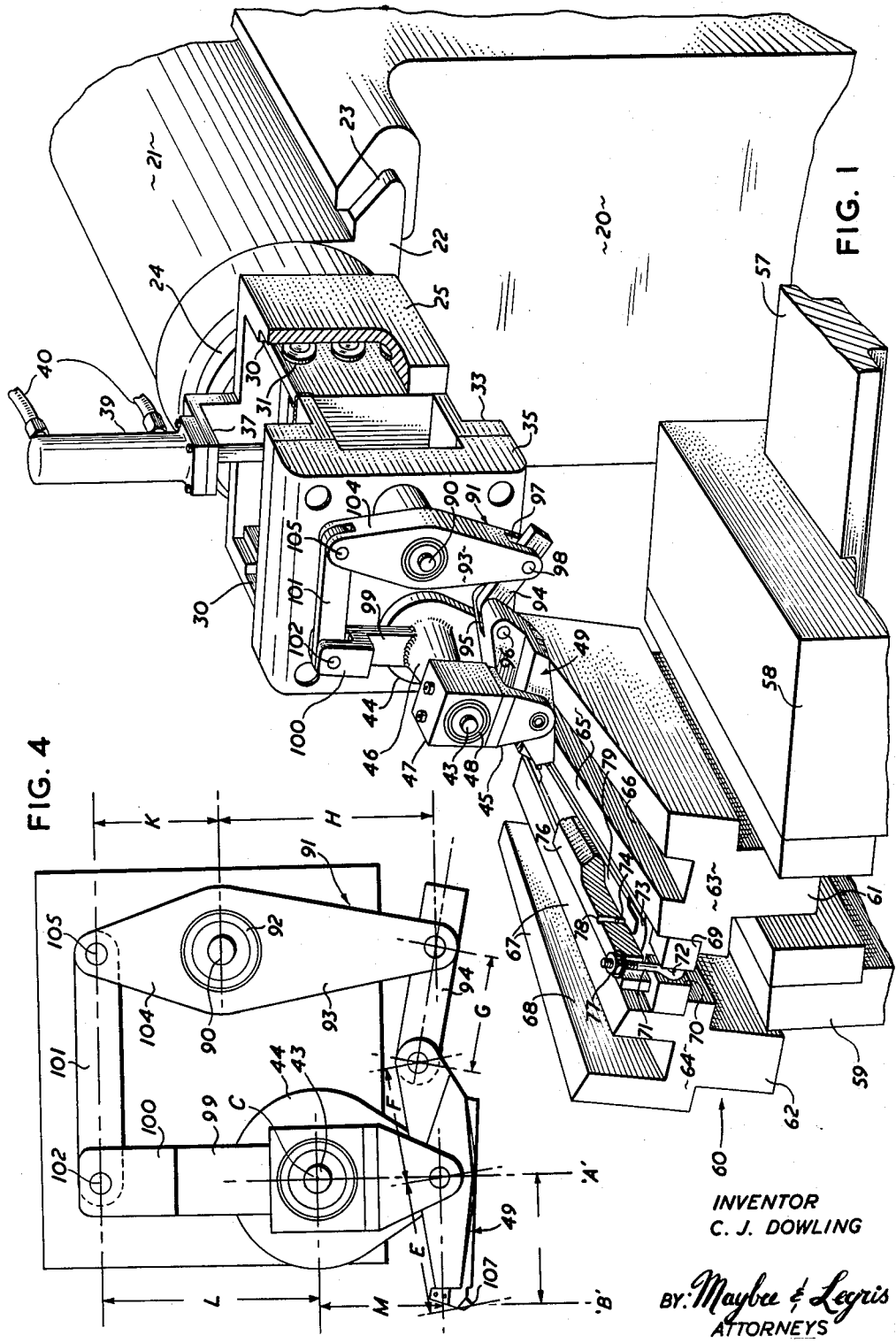

Nov. 15, 1960 C. J. DOWLING 2,960,012
MACHINE TOOLS
Filed April 29, 1959 4 Sheets-Sheet 1

INVENTOR
C. J. DOWLING

BY Maybee & Legris
ATTORNEYS

Nov. 15, 1960   C. J. DOWLING   2,960,012
MACHINE TOOLS

Filed April 29, 1959   4 Sheets-Sheet 2

INVENTOR
C. J. DOWLING

BY: Maybee & Legris
ATTORNEYS

Nov. 15, 1960 C. J. DOWLING 2,960,012
MACHINE TOOLS
Filed April 29, 1959 4 Sheets-Sheet 3

INVENTOR
C. J. DOWLING
BY *Maybee & Legris*
ATTORNEYS

Nov. 15, 1960   C. J. DOWLING   2,960,012
MACHINE TOOLS

Filed April 29, 1959   4 Sheets-Sheet 4

INVENTOR
C. J. DOWLING

BY: Maybee & Legris
ATTORNEYS

# United States Patent Office 2,960,012
Patented Nov. 15, 1960

2,960,012

MACHINE TOOLS

Cecil J. Dowling, Meadowvale, Ontario, Canada, assignor to Orenda Engines Limited, Malton, Ontario, Canada Filed Apr. 29, 1959, Ser. No. 809,834

9 Claims. (Cl. 90—13.5)

This invention relates to machine tools for producing continuous, non-planar surfaces on a workpiece, the surfaces produced being definable by a multiplicity of straight lines in adjacent parallel planes. More particularly, the machine tool of the invention is arranged to cut a continuous, non-planar surface on the edge of a workpiece, particularly along the leading or trailing edge of a sheet metal skin of a blade of aerofoil section, e.g. of a blade for a turbine or compressor of a gas turbine engine.

As is well known, gas turbine engines include bladed rotors for compressors and turbines, and various constructions of blades have been proposed for use in such rotors. Some blades are hollow, some blades are solid, some are cast and some are made from sheet metal. A construction of blade in connection with which the present invention is of value, is a construction wherein the blade has upper and lower sheet metal blade skins, each skin having joint surfaces along its leading and trailing edges which mate with corresponding joint surfaces along the leading and trailing edges of the other skin. Often such blades are twisted, that is to say that their longitudinal, or radial, axis is not a straight line, and difficulties have been encountered in machining the joint surfaces on the leading and trailing edges of the skins of such blades. The surfaces are in the form, generally speaking, of a flat strip bent to follow a roughly helical path. However, the helix is not regular and thus conventional methods of machining a helix are not of use.

The joint surfaces of skins of such blades may be cut by using a shaper tool having a three dimensional hydraulic tracer mechanism, the cutting tool of the shaper being constrained to follow, by remote control, the movements in three dimensions of a tracer which is caused to move over a master profile of the surface to be cut. However, shapers having such a three dimensional tracing system are very expensive and are also specialized tools so that, in many circumstances, the capital monies tied up in their purchase may not be used to the full advantage.

It is therefore an object of the present invention to provide a machine tool which will cut a non-planar surface defined by a multiplicity of straight lines in adjacent parallel planes and which may have, as a basis, a conventional shaping or milling machine.

Another object of the invention, is to provide a machine tool which will produce a continuous, non-planar surface defined by a multiplicity of straight lines in adjacent parallel planes on a workpiece without the necessity of providing remotely controlled three dimensional hydraulic tracer and follower mechanisms.

A further object of the invention is to produce a machine which will cut the joint surfaces on the leading and trailing edges of a sheet metal skin of a twisted blade of aerofoil section.

A still further object of the invention is to provide an attachment which may be readily attached to, and detached from, certain traversing machine tools such as shapers and milling machines.

In the specification and claims, the term "blade of aerofoil section" is used to include compressor blades, turbine blades, propeller blades and similar blades.

Figure 2:
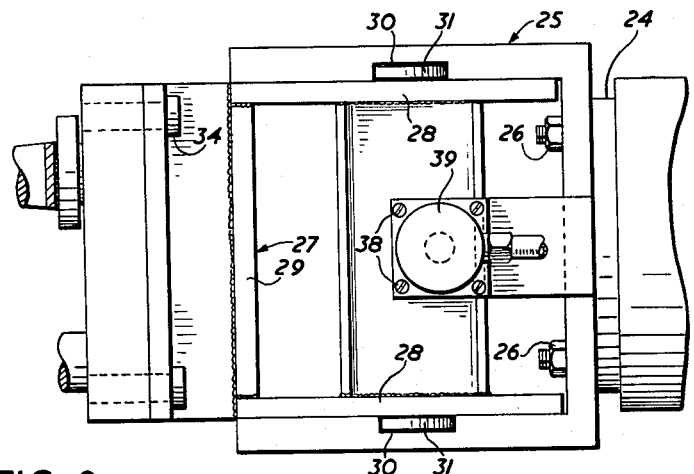
Figure 3:
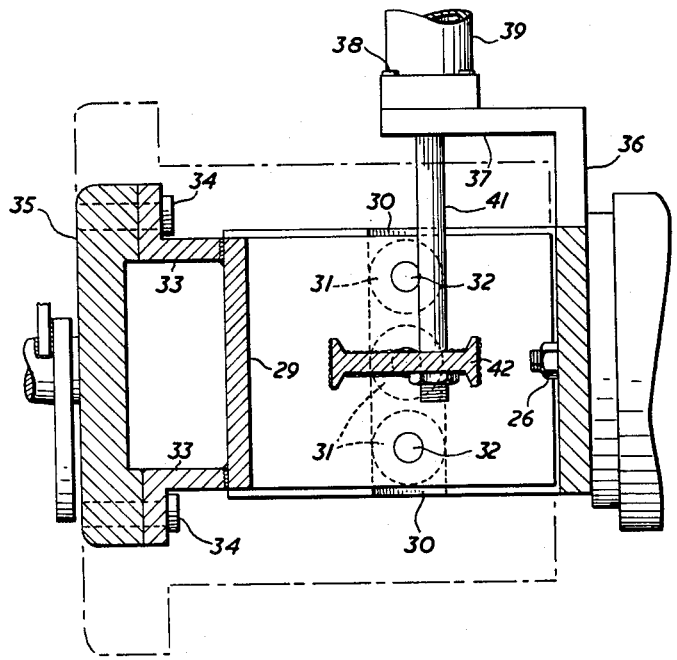
Figure 5:
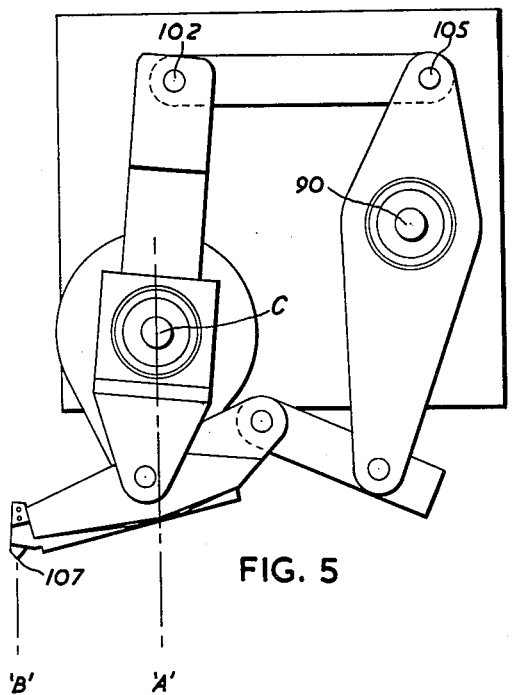
Figure 6:
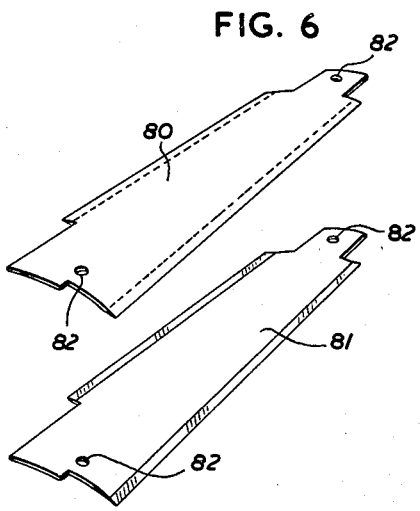
Figure 9:
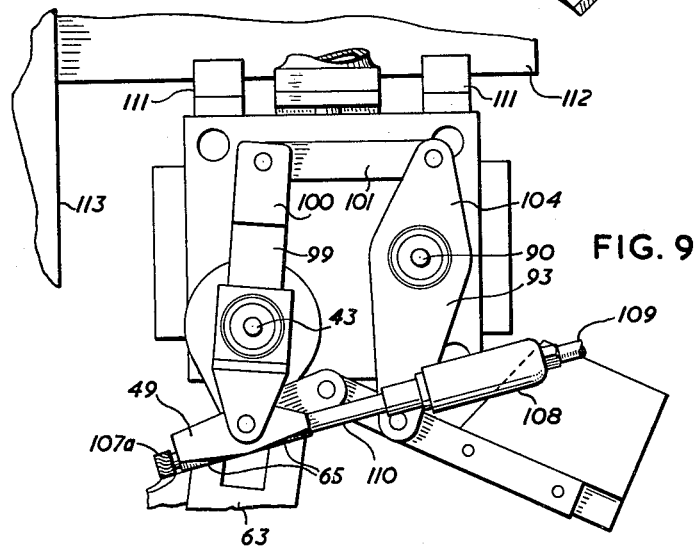
Figure 7:
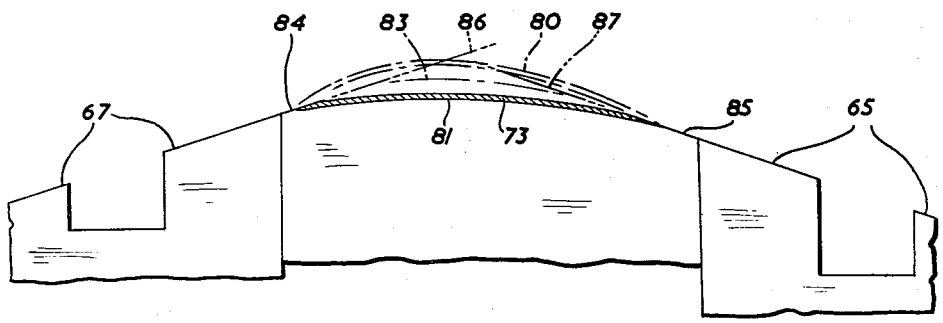
Figure 8:
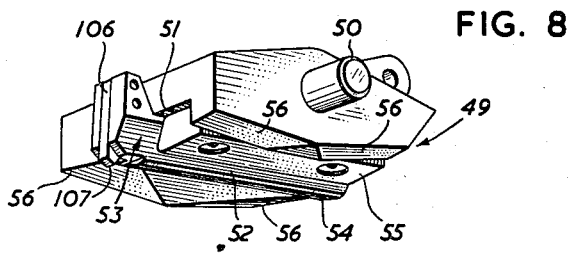

The invention will now be described by way of example with reference to the accompanying drawings, in which like reference numerals indicate similar parts throughout the various views, and in which:

Figure 1 is a perspective view of the working part of a machine tool according to the invention, Figure 2 is a horizontal section through the tool mounting assembly of the tool of Figure 1, Figure 3 is a vertical section through the tool mounting assembly of the tool of Figure 1, Figures 4 and 5 show the orientation of the cutting head and link assembly at different points during a cutting stroke, Figure 6 shows upper and lower blade skin blanks after the joint surfaces have been formed and before assembly, Figure 7 is a diagram showing the respective orientations of the joint surfaces on the blade skin, the camber line of the blade section and the guide surfaces, Figure 8 is a detail, perspective view of the tool holder and tool but of the tool of Figure 1, and Figure 9 is a partial end elevation of a second embodiment of the invention.

In the construction of hollow blades of aerofoil section from upper and lower sheet metal skins, it will be apparent that the strength of the blade will depend to a great extent upon the strength of the joints between the skins. It will also be appreciated that, for ease of assembly, it is desirable to make each joint surface lie along a straight line when viewed in a section transverse to the longitudinal axis of the blade. In these circumstances, each joint surface can be considered to be defined by a multiplicity of straight lines in adjacent parallel planes, the planes being transverse to the longitudinal axis of the blade so that, at any section defined by one of the transverse planes, the joint surface along either the leading or the trailing edge will be a straight line. It will be appreciated, however, that the orientations of the straight lines relative to the longitudinal axis of the blade will vary from one plane to another. In practice, with a twisted blade, the joint surface will somewhat resemble the surface of a flat strip which has been bent into a generally helical form while keeping the surface of the strip rectilinear when viewed at any transverse cross-section.

The cutting of such a generally helical surface presents difficulties since the surface is not regular and it has not heretofore been possible mechanically to cut such surfaces without three dimensional hydraulic tracer mechanisms which operate by remote control and which are very expensive.

The present invention provides relatively simple mechanism for cutting such a surface and utilizes a master guide surface from which the joint surface is to be cut. As will be seen hereinafter, the master surface is also defined by a multiplicity of straiht lines in adjacent parallel planes and the planes containing the lines defining the master guide surface are parallel to the planes containing the lines defining the joint surface.

Referring now to Figure 1, the machine tool comprises basically a shaper tool having a supporting column 20, and an arm 21 mounted in the column 20 and having longitudinal ribs 22 slidable in guideways 23 on the column. The arm 21 is reciprocable by conventional actuating means (not shown) used in shaper machines.

The arm 21 has a face plate 24 to which is bolted a U-shaped mounting member 25, the mounting member being retained in position by stud and nut assemblies 26. The mounting member 25 supports an inner U-shaped member 27 having side walls 28 and a front wall 29 (see Figures 2 and 3). The side walls of the member 25 are grooved at 30 and each side wall 28 of the member 27 carries three rollers 31 on axes 32. The rollers 31 closely fit within the grooves 30 and roll on the side walls of the grooves. The member 27 is movable vertically within the member 25 within the limits shown in chain lines in Figure 3. Welded to the front surface of the plate 29 are a pair of angle brackets 33 and bolted at 34 to the angle brackets 33 is a thrust plate or thrust member 35.

The mounting member 25 has an upward extension 36 which carries a forwardly extending arm 37. Bolted to the free end of the arm 37 at 38 is the cylinder 39 of a pneumatic jack which is supplied with operating fluid through pipes 40. The piston rod 41 of the jack is threaded at its free end and passes through the web of an I-section bar 42 (see Figure 3) welded between the side walls 28 of the member 27.

Referring now to Figure 1, pivotally mounted about a first shaft 43 on the front surface of the thrust member 35 are a pair of first links 44, 45. The links 44, 45 are interconnected by a sleeve 46 and the link 45 also carries a housing 47 within which is mounted a bearing 48 for the shaft 43. Pivotally mounted between the links 44, 45 is a tool holder indicated generally at 49. The tool holder, shown in detail in Figure 8, is formed with a pair of outwardly directed projections, one of which is indicated at 50, and which are pivotally received in apertures in the free ends of the links 44, 45. Mounted in a slideway 51 on the underside of the tool holder is the shank 52 of a tool 53 whose underside is chamfered to provide a substantially linear contact surface 54. The tool is retained in position in the slideway by a wedge block 55. The underside of the tool holder is relieved at 56 at each of the four corners of its under surface.

Returning now to Figure 1, the bed of the machine tool is indicated generally at 57 and includes a pair of movable vice jaws 58 and 59. Gripped between the vice jaws is a base generally indicated at 60 which holds the workpiece and provides the master surfaces from which the surfaces on the workpiece are cut. The base is provided with two gripping spigots, one of which is indicated at 61, gripped between the vice jaws, and the other of which is indicated at 62. Above each gripping spigot there is formed a contour master, one master being indicated generally at 63 and the other at 64. Each contour master has a guide surface which is formed in two spaced apart portions, thus the guide surface of the contour master 63 is indicated at 65, and is formed in two parts separated by a slot 66. Similarly, the guide surface of the contour master 64 comprises two portions 67 separated by a slot 68.

On the base 60, and between the guide surfaces 65 and 67, there is provided means for mounting the blade skin whose edges are to be machined; the mounting means including a block 69 having a slot 70 at each end thereof, the block being retained between the contour masters by bolts (not shown). Pivotally mounted in each slot 70 is an eye bolt 71, the eye of which embraces a pin 72 spanning the slot 70. The block 69 is provided with a bed 73 which is contoured to receive the blade skin and has upstanding therefrom two spaced projections, one of which is shown at 74. Co-operating with the bed 73 to clamp the blade skin thereon is a retaining block 75 which is slotted at 76 at its ends to receive the eye bolts 71 which carry nut and washer assemblies 77. The undersurface of the retaining block 76 is contoured to be complementary to the blade skin and apertures 78 are provided to receive the projections 74. A blade skin is indicated at 79 in Figure 1 clamped in position between the bed 73 and the block 76.

Each of the upper and lower blade skin blanks, indicated in Figure 6 at 80 and 81, is provided with apertures 82 which engage the projections 74 on the bed 73. The apertures 82 are formed in portions of the blanks which are removed during assembly of the blade. A blade skin is mounted on the bed 73 by slackening off the nuts 77, swinging the eye bolts 71 about their pivot pins 72, lifting the retaining block 76, placing the blade skin in position on the bed 73 with the apertures 82 embracing the pins 74, replacing the block 76, pivoting the eye bolts so that the nut and washer assemblies are above the upper surface of the retaining block 76 and then tightening down the nuts to grip the blade skin between the block 76 and the bed 73 and retain it in position on the bed.

Turning now to relationship between the master surfaces and the surfaces to be cut, it is a feature of the preferred forms of the invention that the guide surface of the master is "congruent" with the joint surface to be cut on the workpiece. By "congruent" is meant that both surfaces are formed in the same manner so that if placed together side-by-side they form an extension one of the other and the total extended surface may be considered to be defined by a plurality of straight lines in adjacent parallel planes.

An example will probably clarify the above discussion. As an example, a twisted blade of aerofoil section having upper and lower sheet metal skins has the joint surfaces along the leading and trailing edges of the blades between the blade skins each defined by a plurality of straight lines in adjacent parallel planes normal to the longitudinal axis of the blade. Each of the lines defining a joint surface is a tangent to the camber line of the blade at the intersection of the camber line and the leading or trailing edge of the blade as the case may be. The camber line of an aerofoil section is a line, each point of which is equidistant from the upper and lower boundaires of the aerofoil section, the distances being measured normal to the line itself. The camber line of the section of a twisted blade is a curve joining the leading and trailing edges of the blade at the section.

The master guide surface for cutting such a joint surface could theoretically be formed by placing a metal block alongside the desired joint surface and shaping the surface of the block until the tangents to the camber lines which define the joint surface also lie across the guide surface in contact therewith and therefore define the guide surface. Each surface would then be an extension of the other and a straight edge sweeping along the guide surface, and extended over the workpiece, would sweep out the joint surface. This arrangement has the advantage that only a single surface need be initially developed, the developed surface serving both as the surface to be cut and also the guide surface.

Where the joint surface and the guide surface are true extensions one of the other, as above described, the cutting portions of the tool and the points on the tool holder or follower which engage the guide surface will lie in a plane.

Wherever the term "congruent" is used in the specification and the following claims it has the meaning described above.

Referring now to Figure 7, the lower blade skin 81 is shown laid in position on the bed 73 with the master surfaces 65 and 67 adjacent to the edges of the skin. The upper blade skin 80 is indicated in phantom lines and the camber line of the section is indicated at 83; 84 indicates generally the leading edge of the blade and 85 the trailing edge thereof. The joint surfaces between the skins lie on the lines 86, and 87 which are tangents to the camber line 83 at the leading and trailing edges of the blade respectively. At any transverse section of the blade, the joint surface of the leading edge of the blade lies along a straight line which is a tangent to the camber line of the section at the intersection of the camber line with the leading edge. Similarly, the joint face at the trailing edge of any transverse section, appears as a tangent to the camber line of the section at the intersection of the trailing edge of the blade with the camber line of the section. It follows that the joint surfaces on the blade skins at the leading and trailing edges may each be considered to be defined by a multiplicity of straight lines in adjacent parallel planes, each line being a tangent to the camber line of the section at the intersection of the camber line with the leading or trailing edge as the case may be.

Similarly, the master surfaces employed in the forming of the joint surfaces are themselves composed of a plurality of straight lines in adjacent parallel planes and are continuations of the joint surfaces as shown in Figure 7 so that, at any section, a straight edge can be laid across one of the joint surfaces and its corrsesponding guide surface. Thus in Figure 7 the straight lines 86 and 87 define both the joint surfaces and the guide surfaces 65 and 67.

Referring now to Figures 1, 4 and 5, the front surface of the thrust member is provided with a second shaft 90 projecting parallel to the directions of reciprocation of the arm 21. The shaft 90 carries a double-armed lever 91 which is pivotally mounted on the shaft by a bearing 92. One arm 93 of the lever 91 is pivotally interconnected with the tool holder 49 by a second link 94. The tool holder is slotted at 95 to receive one end of the link 94 and a pin 96 pivotally interconnects the link and the tool holder. The arm 93 is slotted at 97 to receive the link 94 and a pin 98 pivotally interconnects the link and the arm 93. An arm 99 projects upwardly from the sleeve 46 adjacent to the first link 44 and has a forked upper end 100. A third link 101 is pivotally connected at one end by a pin 102 to the end 100 of the arm 99 and the other end of the link 101 is received in a slot 103 in the other arm 104 of the lever 91. A pin 105 interconnects the link 101 and the arm 104.

Referring now to Figures 4, 5 and 8, the tool 53 has a tool bit 106 having a cutting portion 107 which engages the workpiece and cuts the desired surface. Preferably the cutting portion has a point cutting surface and conventional cutting tools may be used. The spacing of shafts 43 and 90 and the lengths of the arms 93, 99, and 104, the links 94 and 101 and the dimensions of the tool holder are such that, as the tool holder 49 is moved in contact with a master surface and is caused to rock, the cutting portion 107 of the tool 106 remains substantially in the same vertical plane. Thus the cutting portion 107 in Figure 4 is in the same vertical plane, indicated at "B," as is the cutting portion 107 shown in Figure 5. In a particular example it has been found that, if the distances marked E, F, G, H, K, L and M in Figure 4 have the following proportions, the cutting point 107 will remain in a plane during permitted movement of the thrust plate 35. The proportions are that $E=F=G=1$; $L=H=3.810$; and $K=M=2.200$. From a more general point of view, the cutting portion 107 of the tool remains in a plane, indicated at "B," parallel to the plane, indicated at "A" in Figures 4 and 5, containing the locus of a fixed point on the thrust member 35 as the latter is traversed and moves towards and away from the base. A point indicated at "C" in Figures 4 and 5 is in this case the fixed point on the thrust member and is on the axis of the first shaft 43 but any convenient point may be taken. It is apparent that in the embodiment shown plane "B" is vertical. This arrangement has advantages which will hereinafter be described.

Referring now to Figure 9, the arrangement therein shown is similar to that shown in Figure 1 except that a milling machine is the basis of the tool and a milling cutter is used instead of a point cutting tool as in the other figures. Parts which are identical in Figures 1 and 9 are denoted by the same reference numerals. The milling cutter is indicated at 107a and is driven by a compressed air motor 108 supplied with compressed air from a source, not shown, through a pipe 109. The shank 110 of the milling cutter is received in the tool holder 49 which in this instance has its undersurface relieved so as to make substantially linear contact with the guide surface 65. The mounting member 25 is provided with jaws 111 which grip the arbor 112 of a milling machine having a main column 113.

As will be seen from Figures 6 and 7, the upper and lower blade skins are of different cross sectional configurations and therefore each skin requires a separate base, bed and master surfaces. Thus the base and bed for an upper skin is shown in Figure 1, while the base and bed for the lower skin 120 is shown in Figure 7. The bases and bed are of similar construction but are varied in dimensions and configurations to suit the blade skin to be worked on.

The operation of the embodiment shown in Figure 1 is as follows. The required base, depending on whether the upper or lower skin is to be machined, is set up between the vice jaws 58 and 59 of the machine and a skin blank 79 is mounted on the bed as hereinbefore described. During this initial part of the procedure, the thrust member 35 and its associated tool holder 49 are lifted away from the base by means of the pneumatic jack 39, 41. When the blade skin has been mounted and clamped in position on the bed 73, the thrust member 35 is lowered by means of the jack until the follower surface 54 of the tool 53 is in contact with the guide surface 65. A predetermined downward pressure may then be applied by the pneumatic jack to maintain the tool in contact with the master surface 65.

The arm 21 is now reciprocated by conventional shaper controls and the tool holder 49 will be caused to traverse the guide surface 65 and will pivot and rise and fall under the influence of the guide surface. During this movement, the cutting portion 107 of the tool 106 will take a straight line cut along the surface of the work. The work is orientated so that the planes containing the straight lines defining the joint surface and its corresponding master surface are normal to the directions of reciprocation of the arm 21, i.e. normal to the reciprocal components of velocity imparted to the thrust member 35 by the arm 21.

The cutting portion 107 of the tool 91 will cut a straight line because of the arrangement of levers and arms hereinbefore described whereby the cutting point of the tool is held in a plane as the tool holder rises and falls and rocks. By this means it is possible for the cutting tool to cut a line very near to the clamping block 76. This is an important feature of the invention since the blade skins are normally made of springy material and are difficult to hold rigidly during machining. The block 76 is dimensioned so that it substantially overlies the blade skin except for the edge joint surfaces to be cut and so holds the edges of the skin rigidly during machining since there is no substantial extent of the skin unclamped. This clamping prevents deflection of the skins during machining whereby accurate joint surfaces may be cut.

Due to the relationship in which the skin and the master are held, as described above, joint surfaces defined by a plurality of straight lines in adjacent parallel planes will be cut by the tool. When a cut has been taken on the joint surface, the base is traversed in a direction normal to the reciprocation of the arm 21 to bring another portion of the surface to be worked under the cutting portion 107 of the tool. This transverse traverse continues until the whole joint surface has been cut. In some cases, it may be possible to cut the joint surface in one pass but normally several passes are required and, as mentioned above, the work is traversed under the cutting tool in such circumstances until the required width of surface has been cut.

When one edge of the blade skin in the base has been cut the base is removed from the vice and the second spigot 62 is placed in the vice so that the other edge of the blade skin may be cut. Similarly, when it is desired to cut the joint surfaces along the edges of the other blade skin then the second base, for the other skin, is mounted in the vice and the surfaces cut as before.

The operation of the embodiment shown in Figure 9 is substantially the same as the embodiment shown in Figure 1. The milling cutter is rotated by its compressed air motor 108 and is traversed along the work by the normal mechanism of the milling machine. It is normally possible to cut the joint surface in one pass with a milling cutter but if more than one pass is required the work is traversed under the cutter until the desired width of surface has been cut.

It will be seen that the invention provides a relatively simple machine tool which is capable of cutting surfaces which heretofore could only be cut by means of expensive remote controlled hydraulic or pneumatic tracer mechanism.

It will be understood that the form of the invention herewith shown and described is a preferred example and various modifications can be carried out without departing from the spirit of the invention or the scope of the appended claims:

What I claim as my invention is:

1. A machine tool, for producing a continuous, non-planar surface on a work-piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, mounting means on the base for holding the work-piece adjacent to the master, and in fixed relation thereto, a thrust member, means to impart to the member traverse components of velocity in directions normal to said planes, means mounting the member for movement towards and away from the base in directions normal to said components of velocity, a tool holder carried in pivotal mountings on the member for rocking movement about an axis parallel to said components of velocity, a cutting tool mounted in the tool holder and having a cutting portion which extends over the work-piece when the latter is mounted on the base, follower means operatively connected to the tool to engage the guide surface on the master, the follower means being maintained in engagement with the guide surface during operation of the tool whereby the tool holder is rocked and the thrust member is moved towards and away from the base as the member is traversed to cause the cutting tool to cut the surface on the work-piece, and means interposed between the thrust member and the tool holder to maintain the cutting portion of the tool, during rocking of the tool holder, substantially in a plane parallel to the plane containing the locus of a fixed point on the thrust member as the latter is traversed and moves towards and away from the base.

2. A machine tool, for producing a continuous, non-planar surface on a work-piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, mounting means on the base for holding the work-piece adjacent to the master and in fixed relation thereto, a thrust member, means to impart to the member traverse components of velocity in directions normal to said planes, means mounting the member for movement toward and away from the base in directions normal to said components of velocity, a shaft carried by the member and extending parallel to said components of velocity, a link pivotally mounted on the shaft, a tool holder carried in pivotal mountings on the link for rocking movement about an axis parallel to said components of velocity, a cutting tool mounted in the tool holder and having a cutting portion which extends over the work-piece when the latter is mounted on the base, follower means operatively connected to the tool to engage the guide surface on the master, means to maintain the follower means in engagement with the guide surface during operation of the tool whereby the tool holder is rocked and the thrust member is moved towards and away from the base as the member is traversed to cause the cutting tool to cut the surface, and further means, in addition to the pivotal mountings, interconnecting the link and the tool holder to maintain the cutting portion of the tool, during rocking of the tool holder, substantially in a plane parallel to the plane containing the locus of a fixed point on the thrust member as the latter is traversed and moves towards and away from the base.

3. A machine tool, for producing a continuous, non-planar surface on a work-piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, mounting means on the base for holding the work-piece adjacent to the master and in fixed relation thereto, a thrust member, means to impart to the member traverse components of velocity in directions normal to said planes, means mounting the member for movement toward and away from the base in directions normal to said components of velocity, first and second spaced apart shafts carried by the member and extending parallel to said components of velocity, a first link pivotally mounted on the first shaft, a tool holder carried in pivotal mountings on the first link for rocking movement about an axis parallel to said components of velocity, a double armed lever pivotally mounted on the second shaft, a second link pivotally interconnecting the tool holder and one arm of said lever, a third link pivotally interconnecting the other arm of the lever and the first link, a cutting tool mounted in the tool holder and having a cutting portion which extends over the work-piece when the latter is mounted on the base, follower means operatively connected to the tool to engage the guide surface on the master, means to maintain the follower means in engagement with the guide surface during operation of the tool whereby the tool holder is rocked and the thrust member is moved towards and away from the base as the member is traversed to cause the cutting tool to cut the surface, the spacing between the shafts and the relative lengths of the links and the arms of the lever being dimensioned to maintain the cutting portion of the tool, during rocking of the tool holder, substantially in a plane parallel to the plane containing the locus of a fixed point on the thrust member as the latter is traversed and moves towards and away from the base.

4. A machine tool, for producing a continuous, non-planar surface on a work-piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, mounting means on the base for holding the work piece adjacent to the master and in fixed relation thereto, a thrust member, means to impart to the member traverse components of velocity in directions normal to said planes, means mounting the member for movement toward and away from the base in directions normal to said components of velocity, first and second spaced apart shafts carried by the member and extending parallel to said components of velocity, a pair of first links pivotally mounted on the first shaft, a sleeve interconnecting the links and mounted on the shaft, an arm projecting from the sleeve, a tool holder carried in pivotal mountings between the links for rocking movement about an axis parallel to said components of velocity, a double armed lever pivotally mounted on the second shaft, a second link pivotally interconnecting the tool holder and one arm of the lever, a third link interconnecting the other arm of the lever and the arm projecting from the sleeve, a cutting tool mounted in the tool holder and having a cutting poriton which extends over the work-piece when the latter is mounted on the base, follower means operatively connected to the tool to engage the guide surface on the master, means to maintain the follower means in engagement with the guide surface during operation of the tool whereby the tool holder is rocked and the thrust member is moved towards and away from the base as the member is traversed to cause the cutting tool to cut the surface, the spacing of the shafts and the relative lengths of the arms and the links being dimensioned to maintain the cutting portion of the tool, during rocking of the tool holder, substantially in a plane parallel to the plane containing the locus of a fixed point on the thrust member as the latter is traversed and moves towards and away from the base.

5. A machine tool, for producing a continuous, non-planar surface on the edge of a sheet metal work-piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, a bed on the base for mounting the work-piece with said edge adjacent to the master, a block to co-operate with the bed, means to releasably secure the block to the bed with the work-piece clamped therebetween in fixed relation to the master, the block substantially overlying the work-piece except for the area to be cut, a thrust member, means to impart to the thrust member traverse components of velocity in directions normal to said planes, means mounting the thrust member for movement toward and away from the base in directions normal to said components of velocity, a tool holder carried in pivotal mountings on the thrust member for rocking movement about an axis parallel to said components of velocity, a cutting tool mounted in the member and having a cutting portion which extends over the edge of the work-piece when the latter is clamped in position on the bed, follower means operatively connected to the tool to engage the guide surface on the master, the follower means being maintained in engagement with the guide surface during operation of the tool whereby the tool holder is rocked and the thrust member is moved towards and away from the base as the member is traversed to cause the cutting tool to cut the surface on the work-piece, and means interposed between the thrust member and the tool holder, in addition to said pivotal mountings, to maintain the cutting portion of the tool, during rocking of the tool holder, substantially in a plane parallel to the plane containing the locus of a fixed point on the thrust member as the latter is traversed and moves towards and away from the base.

6. A machine tool, for producing a continuous, non-planar surface on the edge of a sheet metal work-piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, a bed on the base for mounting the work-piece with said edge adjacent to the master, a block to cooperate with the bed, means to releasably secure the block to the bed with the work-piece clamped therebetween in fixed relation to the master, the block substantially overlying the work-piece except for the area to be cut and having a straight edge adjacent to said area, said edge being parallel to said straight line path, a mounting member, means to traverse the member along a straight line path in directions normal to said planes, a thrust plate, means interconnecting the member and the plate to mount the latter for movement toward and away from the base in directions normal to the directions of traverse of the mounting member, a tool holder, a link pivotally connected at its ends to the tool-holder and thrust plate respectively to mount the tool-holder for rocking movement about an axis parallel to said straight line path, a cutting tool having a cutting portion and being mounted in the tool-holder so that said portion extends over said edge of the work-piece when the latter is clamped in position on the bed, follower means operatively connected to the tool to engage the guide surface on the master, a fluid pressure operated jack interconnected between the mounting member and the thrust plate and operable to bias to the thrust plate towards the base to maintain the follower means in engagement with the guide surface during operation of the tool whereby the tool holder is rocked and the thrust plate is moved towards and away from the base as the mounting member is traversed to cause the cutting tool to cut the surface on the work-piece, and means interposed between the thrust member and the tool holder, in addition to said link, to maintain the cutting portion of the tool, during rocking of the tool holder, substantially in a plane parallel to the plane containing the locus of a fixed point on the thrust plate as the latter is traversed and moved towards and away from the base.

7. A machine tool, for producing a continuous, non-planar surface on the edge of a sheet metal work piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, a bed on the base for mounting the work-piece with said edge adjacent to the master, a block to co-operate with the bed, means to releasably secure the block to the bed with the work-piece clamped therebetween in fixed relation to the master, the block substantially overlying the work-piece except for the area to be cut and having a straight edge normal to said planes adjacent to the area to be cut, a thrust member, means to impart to the member traverse components of velocity in directions normal to said planes, means mounting the member for movement toward and away from the base in directions normal to said components of velocity, first and second spaced apart shafts carried by the member and extending parallel to said components of velocity, a pair of links pivotally mounted on the first shaft, a sleeve interconnecting the links and mounted on the shaft, a tool holder carried in pivotal mountings between the links for rocking movement about an axis parallel to said components of velocity, a double armed lever pivotally mounted on the second shaft, a second link pivotally interconnecting the tool holder and one arm of the lever, a third link interconnecting the other arm of the lever and the sleeve, a cutting tool mounted in the tool holder and having a cutting portion which extends over the work-piece when the latter is mounted on the base, follower means operatively connected to the tool to engage the guide surface on the master, means to maintain the follower means in engagement with the guide surface during operation of the tool whereby the tool holder is rocked and the thrust member is moved towards and away from the base as the member is traversed to cause the cutting tool to cut the surface, the spacing of the shafts and the relative lengths of the arms and the links being dimensioned to maintain the cutting portion of the tool, during rocking of the tool holder, substantially in a plane parallel to the plane containing the locus of a fixed point on the thrust member as the latter is traversed and moves towards and away from the base.

8. A machine tool for producing a continuous, non-planar joint surface along one of the leading and trailing edges of a sheet metal skin of a twisted blade of aerofoil section having leading and trailing edges and a camber line joining the leading and trailing edges at each transverse cross-section of the blade, the joint surface being defined by a multiplicity of straight lines in adjacent parallel planes normal to the longitudinal axis of the blade, each straight line being a tangent to the camber line in the plane containing said straight line at said one edge of the blade, the machine tool comprising a base, a contour master mounted on the base and having a continuous, non-planar guide surface, the guide surface also being defined by a multiplicity of straight lines in adjacent parallel planes and being congruent with the joint surface so that the planes containing the lines defining the guide surface are parallel to the planes containing the lines defining the joint surface, mounting means on the base for holding the skin adjacent to the master and in fixed relation thereto, a thrust member, means to impart to the member traverse components of velocity in directions normal to said planes, means mounting the member for movement toward and away from the base in directions normal to said components of velocity, a tool holder carried in pivotal mountings on the member for rocking movement about an axis parallel to said components of velocity, a cutting tool having a cutting portion and being mounted in the tool holder so that the cutting portion extends over the edge of the skin when the latter is mounted on the base, follower means operatively connected to the tool to engage the guide surface on the master, the follower means being maintained in engagement with the guide surface during operation of the tool whereby the tool is rocked and the thrust member is moved toward and away from the base as the member is traversed to cause the cutting tool to cut the joint surface on the skin, and means interposed between the thrust member and the tool holder, in addition to said pivotal mountings, to maintain the cutting portion of the tool, during rocking of the tool holder, substantially in a plane parallel to the plane containing the locus of a fixed point on the thrust member as the latter is traversed and moves toward and away from the base.

9. A machine tool for producing a continuous, non-planar joint surface along one of the leading and trailing edges of a sheet metal skin of a twisted blade of aerofoil section having leading and trailing edges and a camber line joining the leading and trailing edges at each transverse cross-section of the blade, the joint surface being defined by a multiplicity of straight lines in adjacent parallel planes normal to the longitudinal axis of the blade, each straight line being a tangent to the camber line in the plane containing said straight line at said one edge of the blade, the machine tool comprising a base, a contour master mounted on the base and having a continuous, non-planar guide surface, the guide surface also being defined by a multiplicity of straight lines in adjacent parallel planes and being congruent with the joint surface so that the planes containing the lines defining the guide surface are parallel to the planes containing the lines defining the joint surface, a bed on the base for receiving the skin with said edge adjacent to the master, a block to overlie and co-operate with the bed, means releasably to secure the block to the bed with the skin clamped therebetween in fixed relation to the master, the block substantially overlying the skin except for the area to be cut, a mounting member, means to impart to the member traverse components of velocity along a straight line path in directions normal to said planes, a thrust member, means interconnecting the mounting member and the thrust member and mounting the latter for movement toward and away from the base in directions normal to said components of velocity, a tool holder carried in pivotal mountings on the thrust member for rocking movement about an axis parallel to said straight line path, a double armed lever pivotally mounted on the thrust member, a second link pivotally interconnecting the tool holder and one arm of the lever, a third link pivotally interconnecting the first links and the other arm of the lever, a cutting tool having a cutting portion and being mounted in the tool-holder so that the cutting portion extends over the edge of the skin when the latter is clamped in position on the bed, and follower means operatively connected to the tool to engage the guide surface on the master, the follower means being maintained in engagement with the guide surface during operation of the tool whereby the tool is rocked and the thrust member is moved toward and away from the base as the members are traversed to cause the cutting tool to cut the joint surface on the skin, the relative lengths of the arms and the links being dimensioned to maintain the cutting portion of the tool, during rocking of the tool holder, substantially in a plane parallel to the plane containing the locus of a fixed point on the thrust member as the latter is traversed and moves toward and away from the base.

References Cited in the file of this patent

UNITED STATES PATENTS

| | | |
|---|---|---|
| 2,524,091 | Zimmermann | Oct. 3, 1950 |
| 2,737,856 | Creek et al. | Mar. 13, 1956 |
| 2,741,164 | Smedley | Apr. 10, 1956 |
| 2,841,052 | Lucy | July 1, 1958 |